United States Patent
Wong et al.

(10) Patent No.: US 11,982,389 B2
(45) Date of Patent: May 14, 2024

(54) DOUBLE CONTAINMENT FITTINGS FOR CONNECTING DOUBLE CONTAINMENT TUBING

(71) Applicant: K.D.W. Company Limited, Hong Kong. SAR. (CN)

(72) Inventors: Kwok Din Wong, Hong Kong (CN); Sai Hin Wong, Hong Kong (CN); Hang Yan Wong, Hong Kong (CN)

(73) Assignee: K.D.W. Company Limited, Hong Kong (CN)

( * ) Notice: Subject to any disclaimer, the term of this patent is extended or adjusted under 35 U.S.C. 154(b) by 63 days.

(21) Appl. No.: 17/932,811

(22) Filed: Sep. 16, 2022

(65) Prior Publication Data
US 2024/0093820 A1 Mar. 21, 2024

(51) Int. Cl.
*F16L 39/00* (2006.01)
(52) U.S. Cl.
CPC .................. *F16L 39/005* (2013.01)
(58) Field of Classification Search
CPC .......... F16L 39/005; F16L 41/02; F16L 43/00
See application file for complete search history.

(56) References Cited

U.S. PATENT DOCUMENTS

| | | | | |
|---|---|---|---|---|
| 2,475,635 A | * | 7/1949 | Parsons | F16L 39/005 285/133.11 |
| 3,834,341 A | * | 9/1974 | Sexton | F16L 39/005 440/89 C |
| 4,786,088 A | * | 11/1988 | Ziu | F16L 39/005 285/133.11 |
| 4,886,305 A | * | 12/1989 | Martin | F16L 39/005 285/123.17 |

(Continued)

FOREIGN PATENT DOCUMENTS

| | | | | |
|---|---|---|---|---|
| EP | 3051198 A1 | | 8/2016 | |
| EP | 3217060 A1 | * | 9/2017 | ............ F16L 39/005 |

(Continued)

OTHER PUBLICATIONS

Search Report issued in corresponding European Application No. 23197439.5, dated Jan. 26, 2024 (9 pages).

*Primary Examiner* — Matthew Troutman
*Assistant Examiner* — Fannie C Kee
(74) *Attorney, Agent, or Firm* — FLYNN THIEL, P.C.

(57) ABSTRACT

A double containment fitting for engagement with double containment pipes and comprising a one-piece integral structure having at least one outer cylinder having at least two outer receiving openings, at least one inner cylinder having at least two inner receiving openings, and a plurality of ribs integral with and spacing the at least one outer cylinder from the at least one inner cylinder, thereby forming an inner fitting flow area within the inner cylinder and forming an outer fitting flow area between the at least one outer cylinder and the at least one inner cylinder and between adjacent ribs. Each inner tube of the double containment pipes are connected to the double containment fitting by being located within one of the inner receiving openings. Each outer tube of the double containment pipes are connected to the double containment fitting by being located within one of the outer receiving openings.

17 Claims, 11 Drawing Sheets

(56) References Cited

U.S. PATENT DOCUMENTS

| | | | | |
|---|---|---|---|---|
| 5,141,261 A | * | 8/1992 | Ziu | F16L 39/005 |
| | | | | 285/123.1 |
| 5,186,502 A | * | 2/1993 | Martin | F16L 39/005 |
| | | | | 285/179 |
| 5,449,204 A | * | 9/1995 | Greene | F16L 39/005 |
| | | | | 285/179 |
| 5,482,088 A | * | 1/1996 | Ziu | F16L 39/005 |
| | | | | 285/179 |
| 5,497,809 A | * | 3/1996 | Wolf | F16L 39/005 |
| | | | | 138/148 |

FOREIGN PATENT DOCUMENTS

| | | | | |
|---|---|---|---|---|
| JP | 2021058915 A | * | 4/2021 | F16L 39/005 |
| WO | WO-9217725 A1 | * | 10/1992 | F16L 39/005 |
| WO | WO-2011073770 A1 | * | 6/2011 | F16L 39/005 |
| WO | 2012/070946 A1 | | 5/2012 | |

* cited by examiner

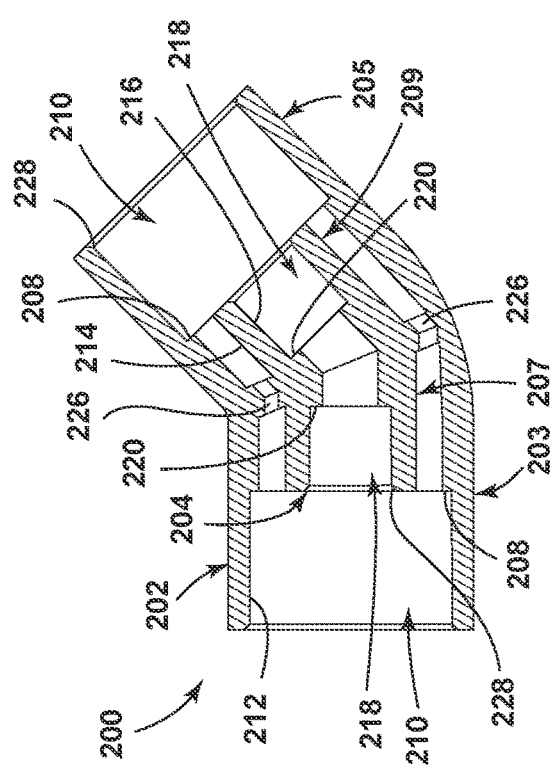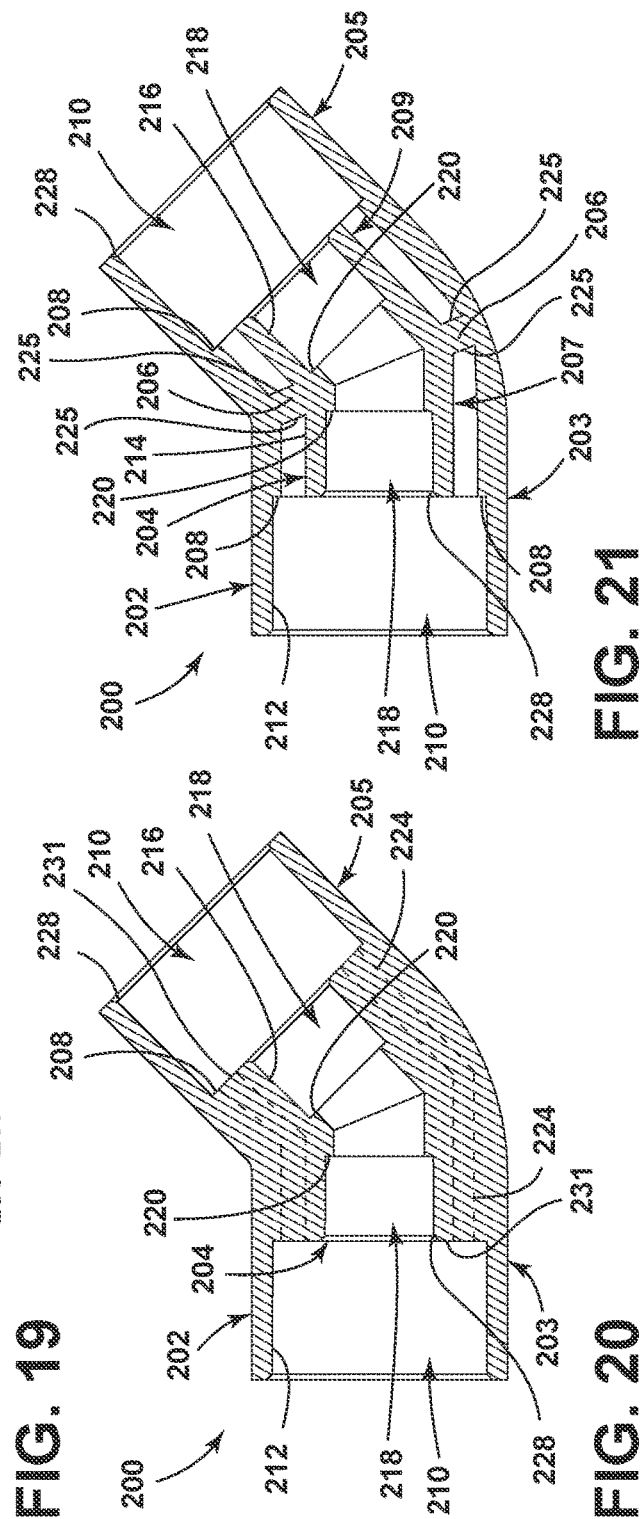
FIG. 19
FIG. 20
FIG. 21

DOUBLE CONTAINMENT FITTINGS FOR CONNECTING DOUBLE CONTAINMENT TUBING

FIELD OF THE INVENTION

This disclosure relates generally to the field of tubing, and in particular for double containment fittings for connecting double containment tubing.

BACKGROUND OF THE INVENTION

Double containment piping systems comprise double containment pipes having an inner tube surrounded by an outer tube. Spacers space the inner tube from the outer tube. The inner tube is configured to have a fluid flow therethrough. The outer tube is configured to contain fluid within the piping system in case fluid escapes from the inner tube. Double containment piping systems can be used to protect against leaks of corrosive or hazardous fluids from the inner tube.

FIG. 22 illustrates a prior art example of a double containment pipe 12 wherein an inner tube 16 and an outer tube 18 are separated from each other by spacers 20 that are longitudinally extending and integral with the inner tube 16 and the outer tube 18. Other prior art double containment pipes can include nonintegral spacers between the inner tube 16 and the outer tube 18 that are positioned in an interference fit to maintain the inner tube 16 in position within the outer tube 18.

Conventional double containment fittings for the double containment piping system are connected to ends of the double containment pipes. The double containment fittings provide for a longer piping system and/or for the piping system to have bends and/or splits in fluid flows. The double containment fittings are made of assemblies of several separate pieces which can allow for fluid to leak from the fittings at the intersection of the several separate pieces of the fittings and/or when the several separate pieces of the fittings become loose.

Safer and more stable double containment fittings are desired.

SUMMARY OF THE INVENTION

The present invention, according to one aspect, is directed to a double containment tubing assembly comprising a plurality of double containment pipes, with each of the plurality of double containment pipes having an inner tube surrounded by an outer tube and a plurality of spacers spacing the inner tube from the outer tube. Each of the plurality of double containment pipes also has an inner flow path within the inner tube and an outer flow path located between the inner tube and the outer tube. The double containment tubing assembly also includes a double containment fitting, with the double containment fitting being connected to at least two of the plurality of double containment pipes. The double containment fitting is formed as one-piece integral structure and comprises at least one outer cylinder having at least two outer receiving openings, at least one inner cylinder having at least two inner receiving openings, and a plurality of ribs integral with and spacing the at least one outer cylinder from the at least one inner cylinder, thereby forming an inner fitting flow area within the inner cylinder and forming an outer fitting flow area between the at least one outer cylinder and the at least one inner cylinder and between adjacent ribs. Each inner tube of the at least two of the plurality of double containment pipes is connected to the double containment fitting being located within one of the inner receiving openings of the at least one inner cylinder of the double containment fitting. Each outer tube of the at least two of the plurality of double containment pipes is connected to the double containment fitting being located within one of the outer receiving openings. A first fluid flow path is located in the inner flow path and the inner fitting flow area of the double containment tubing assembly such that fluid is configured to flow through the first fluid flow path without leaking from the first fluid flow path. A second fluid flow path is located in the outer flow path and the outer fitting flow area of the double containment tubing assembly such that fluid is configured to flow through the second fluid flow path if a leakage occurs from the first fluid flow path.

Yet another aspect of the present invention is to provide a double containment fitting for engagement with a plurality of double containment pipes each having an inner tube surrounded by an outer tube and a plurality of spacers spacing the inner tube from the outer tube. The double containment fitting comprises a one-piece integral structure comprising at least one outer cylinder having at least two outer receiving openings, at least one inner cylinder having at least two inner receiving openings, and a plurality of ribs integral with and spacing the at least one outer cylinder from the at least one inner cylinder, thereby forming an inner fitting flow area within the inner cylinder and forming an outer fitting flow area between the at least one outer cylinder and the at least one inner cylinder and between adjacent ribs. Each inner tube of the at least two of the plurality of double containment pipes is configured to be connected to the double containment fitting by being located within one of the inner receiving openings of the at least one inner cylinder of the double containment fitting. Each outer tube of the at least two of the plurality of double containment pipes is configured to be connected to the double containment fitting by being located within one of the outer receiving openings. The inner flow path is configured such that fluid is configured to flow through the inner flow path without leaking from the inner flow path. The outer fluid flow path is configured such that fluid is configured to flow through the outer fluid flow path if a leakage occurs from the inner fluid flow path.

BRIEF DESCRIPTION OF THE DRAWINGS

One or more embodiments of the present invention are illustrated by way of example and should not be construed as being limited to the specific embodiments depicted in the accompanying drawings, in which like reference numerals indicate similar elements.

FIG. 19 is a cross-sectional view of the 45° elbow double containment fitting according to an embodiment of the present invention.

FIG. 20 is a cross-sectional view of the 45° elbow double containment fitting according to an embodiment of the present invention taken along the line XX-XX of FIG. 18.

FIG. 21 is a cross-sectional view of the 45° elbow double containment fitting according to an embodiment of the present invention.

Certain terminology will be used in the following description for convenience in reference only and will not be limiting. Said terminology will include the words specifically mentioned, derivatives thereof, and words of similar import.

DETAILED DESCRIPTION

Reference will now be made in detail to implementations and embodiments of various aspects and variations of the invention, examples of which are illustrated in the accompanying drawings. Although at least two variations of the systems, methods and uses are described, other variations of the systems, methods and uses may include aspects of the systems, methods and uses described herein combined in any suitable manner having combinations of all or some of the aspects described.

Figure 1:
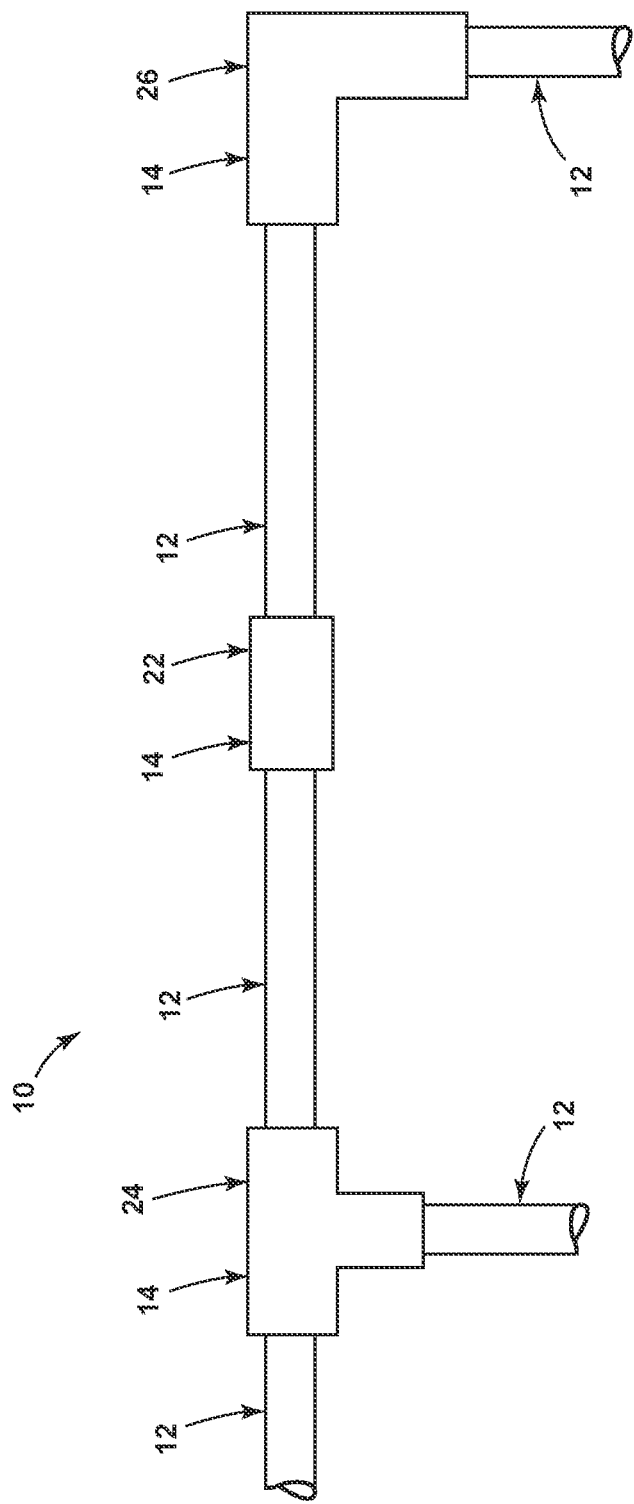
FIG. 1 is a side view of a double containment piping system employing double containment fittings according to an embodiment of the present invention.
Figure 2:
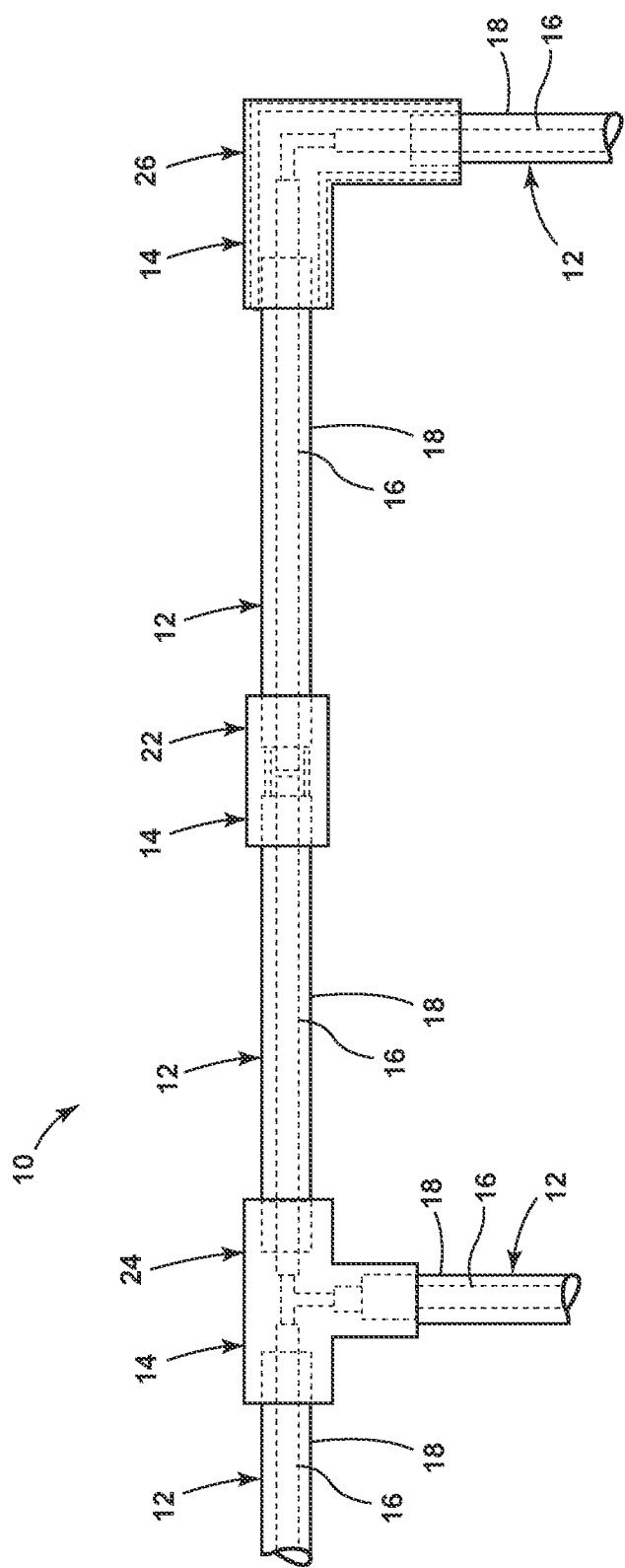
FIG. 2 is a side view of the double containment piping system employing double containment fittings according to an embodiment of the present invention, with transparent elements.
Figure 4:
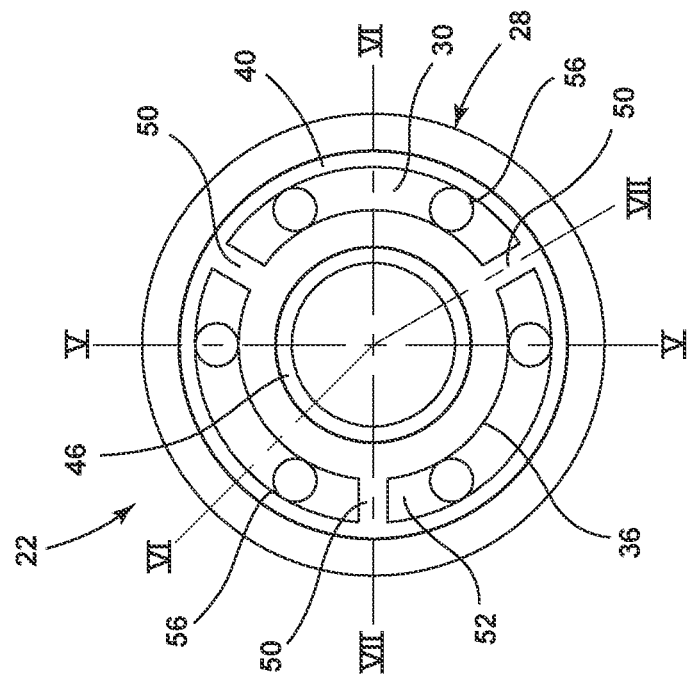
FIG. 4 is an end view of the union socket double containment fitting according to an embodiment of the present invention.
Figure 3:
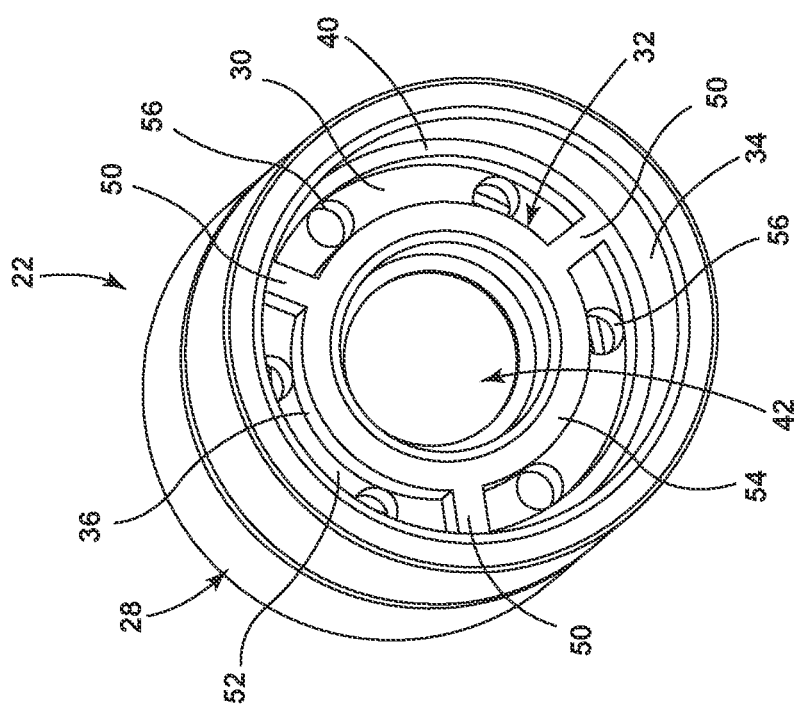
FIG. 3 is a perspective view of a union socket double containment fitting according to an embodiment of the present invention.
Figure 22:
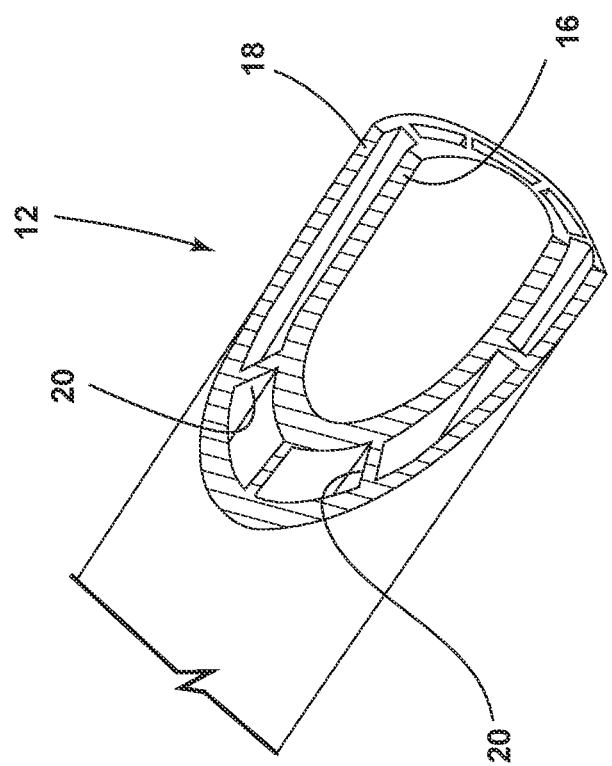
FIG. 22 is a perspective view of a prior art double containment pipe.

FIGS. 1-2 illustrate embodiments of a double containment tubing assembly 10. The double containment tubing assembly 10 includes prior double containment pipes 12 connected to each other by embodiments of double containment fittings 14 of the present invention. The double containment pipes 12 include an inner tube 16 and an outer tube 18 separated from each other by spacers 20. FIG. 22 illustrates a prior art example of the double containment pipe 12 wherein the inner tube 16 and the outer tube 18 are separated from each other by spacers 20 that are longitudinally extending and integral with the inner tube 16 and the outer tube 18. Other prior art double containment pipes 12 can include spacers between the inner tube 16 and the outer tube 18 that are positioned in an interference fit to maintain the inner tube 16 in position within the outer tube 18. Such prior art double containment pipes 12 are well known to those skilled in the art.

The double containment fittings 14 in FIGS. 1-2 include a union socket double containment fitting 22, a T-shaped double containment fitting 24, and an 90° elbow double containment fitting 26. The double containment fittings 14 of an embodiment of the present invention are integral one-piece structures that can be formed by injection molding or cast molding plastic materials. Other double containment fittings 14 as discussed in more detail below can be used in the double containment tubing assembly 10. It is contemplated that the double containment fittings 14 can have opaque surfaces as illustrated in FIG. 1 or can be formed from transparent plastic as illustrated in FIG. 2.

FIGS. 3-7 illustrate an embodiment of the union socket double containment fitting 22 of the present invention. The union socket double containment fitting 22 includes an outer cylinder 28, a centrally located transverse partition 30, and an inner cylinder 32. The centrally located transverse partition 30 is formed integral with an inner surface 34 of the outer cylinder 28 and with an outer surface 36 of the inner cylinder 32.

Figure 5:
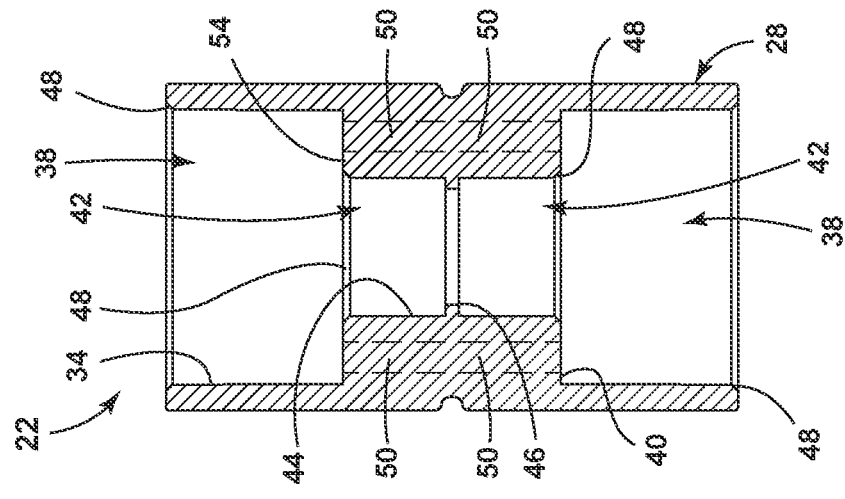
FIG. 5 is a cross-sectional view of the union socket double containment fitting according to an embodiment of the present invention taken along the line V-V of FIG. 4.
Figure 6:
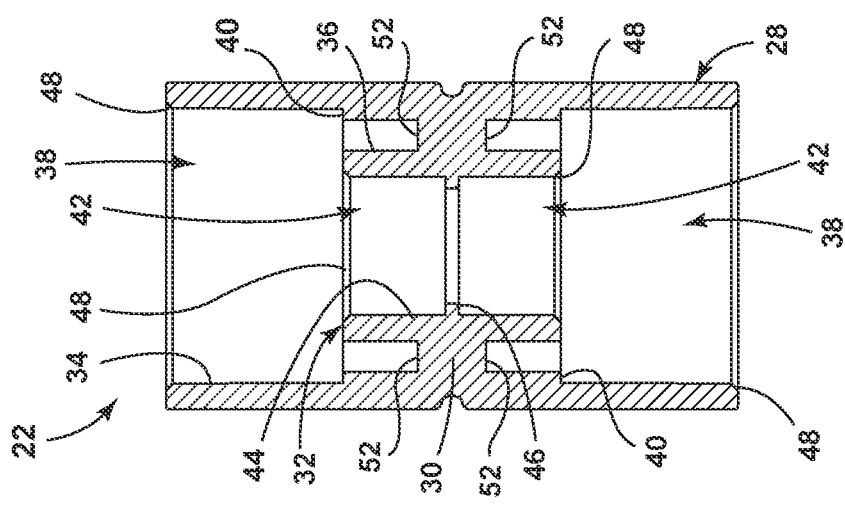
FIG. 6 is a cross-sectional view of the union socket double containment fitting according to an embodiment of the present invention taken along the line VI-VI of FIG. 4.
Figure 7:
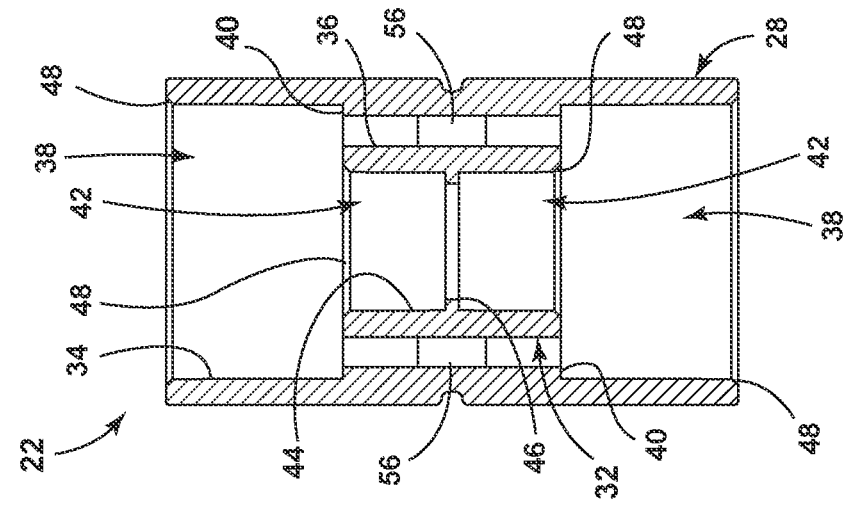
FIG. 7 is a cross-sectional view of the union socket double containment fitting according to an embodiment of the present invention taken along the line VII-VII of FIG. 4.
Figure 8:
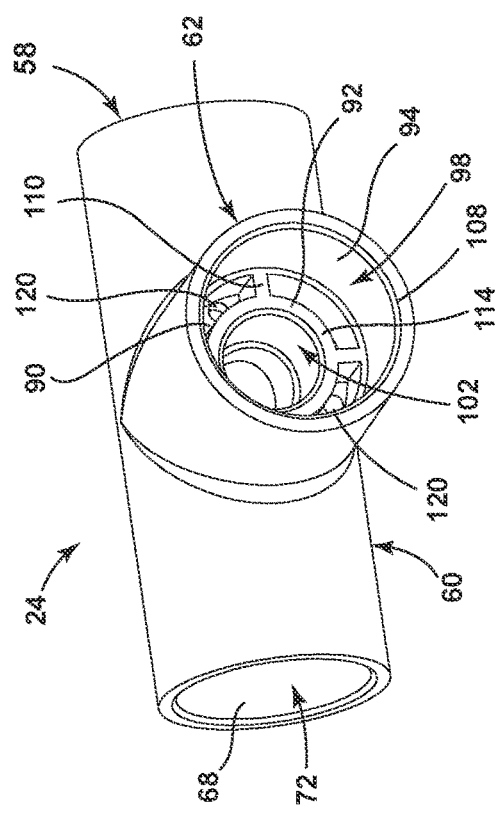
FIG. 8 is a first perspective view of a T-shaped double containment fitting according to an embodiment of the present invention.
Figure 10:
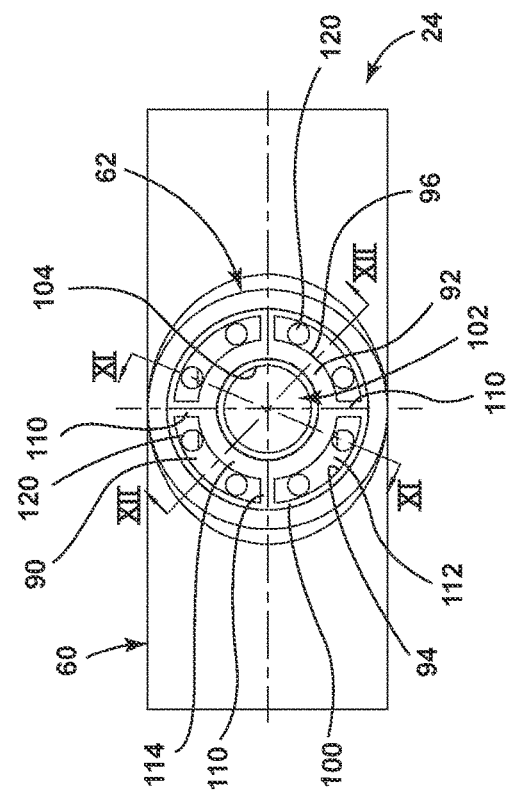
FIG. 10 is a bottom view of the T-shaped double containment fitting according to an embodiment of the present invention.
Figure 9:
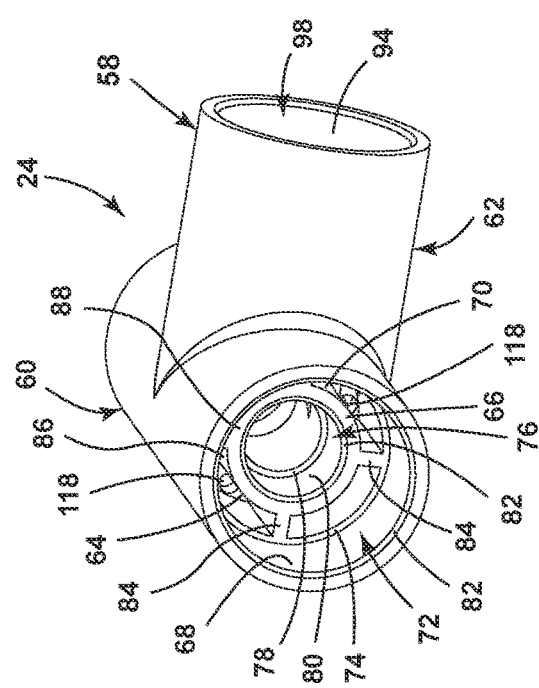
FIG. 9 is a second perspective view of the T-shaped double containment fitting according to an embodiment of the present invention.

As shown in FIGS. 5-7, the illustrated outer cylinder 28 of the union socket double containment fitting 22 forms a pair of outer receiving openings 38 for receiving the outer tube 18 of the double containment pipe 12. A pair of circular outer ledges 40 are formed on the inner surface 34 of the outer cylinder 28 that act as an abutment for the outer tube 18 of the double containment pipe 12 as the double containment pipes 12 are inserted into the union socket double containment fitting 22. It is contemplated that the outer tube 18 of the double containment pipe 12 can be held within the union socket double containment fitting 22 via an interference fit and/or using an adhesive. It is further contemplated that the circular outer ledges 40 could form a closed circle or have one or more interruptions. Likewise, the illustrated inner cylinder 32 forms a pair of inner receiving openings 42 for receiving the inner tube 16 of the double containment pipe 12. A circular inner ledge 46 is formed on an inner surface 44 of the inner cylinder 32 at a central location thereof that acts as an abutment for the inner tubes 16 of the double containment pipes 12 as the double containment pipes 12 are inserted into the union socket double containment fitting 22. It is contemplated that the inner tubes 16 of the double containment pipes 12 can be held within the union socket double containment fitting 22 via an interference fit and/or using an adhesive. It is further contemplated that the circular inner ledge 46 could form a closed circle or have one or more interruptions. The outer receiving openings 38 and the inner receiving openings 42 can have beveled outer edges 48 for easy insertion of tubes therein.

In the illustrated example, the union socket double containment fitting 22 includes features for stabilizing the structure and for allowing fluid to flow through the outer compartment between the inner cylinder 32 and the outer cylinder 28. As shown in FIGS. 3-7, a plurality of longitudinally extending ribs 50 extend from each lateral surface 52 of the centrally located transverse partition 30 between the inner surface 34 of the outer cylinder 28 and the outer surface 36 of the inner cylinder 32. In the illustrated example, the longitudinally extending ribs 50 terminate at the same level as the ends of the inner cylinder 32 such that the ends of the ribs 50 and the inner cylinder 32 form a flat surface 54. However, it is contemplated that the longitudinally extending ribs 50 could end before the ends of the inner cylinder 32 or extend beyond the end of the inner cylinder 32. While three equally spaced longitudinally extending ribs 50 are shown at each outer receiving opening 38, it is contemplated that any number of longitudinally extending ribs 50 with any spacing could be employed. Furthermore, to allow fluid to flow through the outer compartment between the inner cylinder 32 and the outer cylinder 28, the centrally located transverse partition 30 includes a plurality of drain holes 56. While six equally spaced drain holes 56 are shown, it is contemplated that any number of drain holes 56 with any spacing could be employed.

FIGS. 8-12 illustrate an embodiment of the T-shaped double containment fitting 24 of the present invention. The T-shaped double containment fitting 24 includes a T-shaped outer structure 58 comprising a main outer cylinder 60 and a lateral branch outer cylinder 62 extending laterally from a central area of the main outer cylinder 60. The T-shaped double containment fitting 24 is configured to be connected to three double containment pipes 12, with two of the double containment pipes 12 being linearly aligned within the main outer cylinder 60 and a third of the double containment pipes 12 being perpendicular to the two other double containment pipes 12 and being within the lateral branch outer cylinder 62.

In the illustrated example, the structure of the T-shaped double containment fitting 24 within the main outer cylinder 60 is similar to the union socket double containment fitting 22. The main outer cylinder 60 includes a first centrally located transverse partition 64 and a first inner cylinder 66. The first centrally located transverse partition 64 is formed integral with an inner surface 68 of the main outer cylinder 60 and with an outer surface 70 of the first inner cylinder 66. As shown in FIGS. 8-12, the illustrated main outer cylinder 60 forms a pair of aligned outer receiving openings 72 for receiving the outer tubes 18 of the linearly aligned double containment pipes 12. A pair of circular outer ledges 74 are formed on the inner surface 68 of the main outer cylinder 60 that act as an abutment for the outer tubes 18 of the double containment pipes 12 as the double containment pipes 12 are inserted into the main outer cylinder 60. It is contemplated that the outer tubes 18 of the double containment pipes 12 can be held within the main outer cylinder 60 via an interference fit and/or using an adhesive. It is further contemplated that the circular outer ledges 74 could form a closed circle or have one or more interruptions. Likewise, the illustrated first inner cylinder 66 forms a pair of aligned inner receiving openings 76 for receiving the inner tubes 16 of the double containment pipes 12. Circular inner ledges 78 are formed on an inner surface 80 of the first inner cylinder 66 that act as abutments for the inner tubes 16 of the double containment pipes 12 as the double containment pipes 12 are inserted into the inner receiving openings 76. It is contemplated that the inner tubes 16 of the double containment pipes 12 can be held within the inner receiving openings 76 via an interference fit and/or using an adhesive. The aligned outer receiving openings 72 and the aligned inner receiving openings 76 can have beveled outer edges 82 for easy insertion of tubes therein.

In the illustrated example, the main outer cylinder 60 of the T-shaped double containment fitting 24 includes a plurality of longitudinally extending main ribs 84 extending from each lateral surface 86 of the first centrally located transverse partition 64 between the inner surface 68 of the main outer cylinder 60 and the outer surface 70 of the first inner cylinder 66. In the illustrated example, the longitudinally extending ribs 84 terminate at the same level as the ends of the first inner cylinder 66 such that the ends of the ribs 84 and the first inner cylinder 66 form a flat surface 88. However, it is contemplated that the longitudinally extending main ribs 84 could end before the ends of the first inner cylinder 66 or extend beyond the end of the first inner cylinder 66. While four equally spaced longitudinally extending main ribs 84 are shown, it is contemplated that any number of longitudinally extending main ribs 84 with any spacing could be employed.

Figure 11:
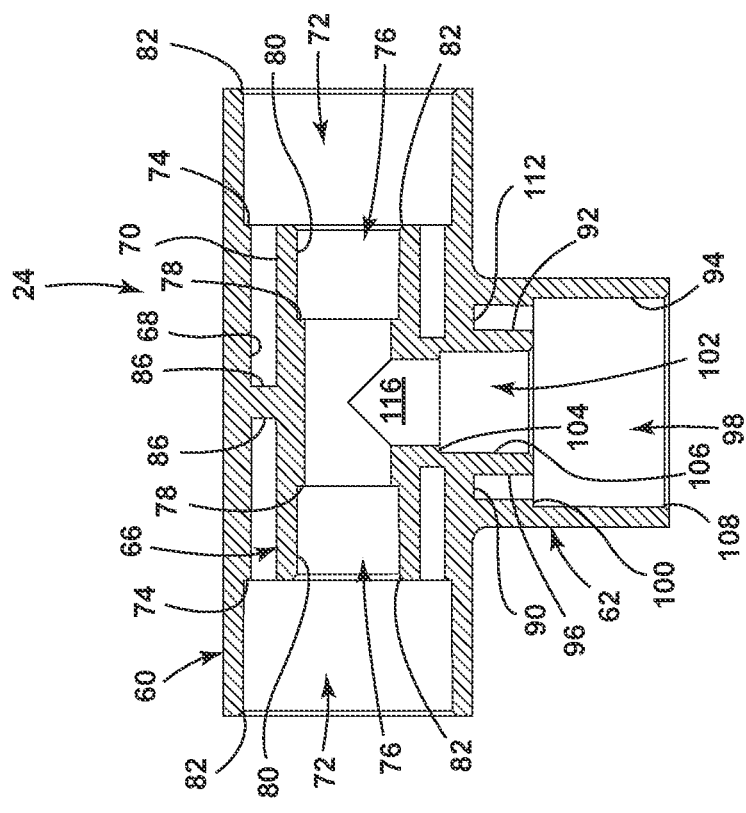
FIG. 11 is a cross-sectional view of the T-shaped double containment fitting according to an embodiment of the present invention taken along the line XI-XI of FIG. 10.
Figure 12:
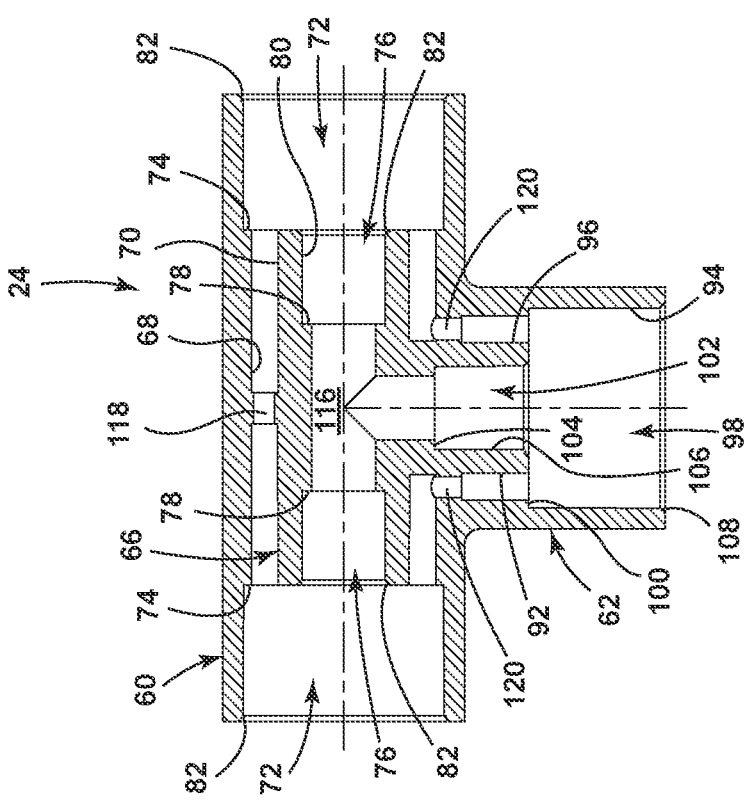
FIG. 12 is a cross-sectional view of the T-shaped double containment fitting according to an embodiment of the present invention taken along the line XII-XII of FIG. 10.

The illustrated lateral branch outer cylinder 62 of the T-shaped outer structure 58 of the T-shaped double containment fitting 24 is connected perpendicularly to the main outer cylinder 60. The lateral branch outer cylinder 62 includes a second centrally located transverse partition 90 and a second inner cylinder 92. As shown in FIGS. 11 and 12, the second centrally located transverse partition 90 is substantially aligned with a portion of the main outer cylinder 60. The second centrally located transverse partition 90 is formed integral with both the main outer cylinder 60 and the second inner cylinder 92. The second centrally located transverse partition 90 is also integral with an inner surface 94 of the lateral branch outer cylinder 62 and with an outer surface 96 of the second inner cylinder 92. As shown in FIGS. 8-12, the illustrated lateral branch outer cylinder 62 forms a lateral outer receiving opening 98 for receiving the outer tube 18 of the lateral double containment pipe 12. A circular outer ledge 100 is formed on the inner surface 94 of the lateral branch outer cylinder 62 that acts as an abutment for the outer tube 18 of the double containment pipe 12 as the double containment pipe 12 is inserted into the lateral branch outer cylinder 62. It is contemplated that the outer tube 18 of the double containment pipe 12 can be held within the lateral branch outer cylinder 62 via an interference fit and/or using an adhesive. It is further contemplated that the circular outer ledge 100 could form a closed circle or have one or more interruptions.

Likewise, in the illustrated example, the illustrated second inner cylinder 92 forms a lateral inner receiving opening 102 for receiving the inner tube 16 of the lateral double containment pipe 12. A circular inner ledge 104 is formed on an inner surface 106 of the second inner cylinder 92 that acts as an abutment for the inner tube 16 of the double containment pipe 12 as the lateral double containment pipe 12 is inserted into the lateral inner receiving opening 102. It is contemplated that the inner tube 16 of the lateral double containment pipe 12 can be held within the lateral inner receiving opening 102 via an interference fit and/or using an adhesive. The lateral outer receiving opening 98 and the lateral inner receiving opening 102 can have beveled outer edges 108 for easy insertion of tubes therein.

In the illustrated example, the lateral branch outer cylinder 62 of the T-shaped double containment fitting 24 includes a plurality of longitudinally extending branch ribs 110 extending from an outer surface 112 of the second centrally located transverse partition 90 between the inner surface 94 of the lateral branch outer cylinder 62 and the outer surface 96 of the second inner cylinder 92. In the illustrated example, the longitudinally extending ribs branch 110 terminate at the same level as the end of the second inner cylinder 92 such that the ends of the branch ribs 110 and the second inner cylinder 92 form a flat surface 114. However, it is contemplated that the longitudinally extending branch ribs 110 could end before the ends of the second inner cylinder 92 or extend beyond the end of the second inner cylinder 92. While four equally spaced longitudinally extending branch ribs 110 are shown, it is contemplated that any number of longitudinally extending branch ribs 110 with any spacing could be employed.

The illustrated T-shaped double containment fitting 24 is configured to connect the inner fluid path of the three double containment pipes 12 connected thereto and the outer fluid path of the double containment pipes 12 connected thereto. As illustrated in FIGS. 11 and 12, the T-shaped double containment fitting 24 includes a T-shaped central path 116 where the first inner cylinder 66 and the second inner cylinder 92 intersect. The T-shaped central path 116 connects the inner fluid path of the three double containment pipes 12 connected to the T-shaped double containment fitting 24. The T-shaped double containment fitting 24 further includes a plurality of first drain holes 118 through the first centrally located transverse partition 64 to allow fluid to flow through the outer compartment between the first inner cylinder 66 and the main outer cylinder 60. While six first drain holes 118 are shown, it is contemplated that any number of first drain holes 118 with any spacing could be employed. The first drain holes 118 are not located with equal spacing as the second inner cylinder 92 blocks a lower portion of the first centrally located transverse partition 64 from having first drain holes 118. The T-shaped double containment fitting 24 further includes a plurality of second drain holes 120 through the second centrally located transverse partition 90 to allow fluid to flow through the outer compartment between the second inner cylinder 92 and the lateral branch outer cylinder 62 into the outer compartment between the first inner cylinder 66 and the main outer cylinder 60. While eight substantially equally spaced second drain holes 120 are shown, it is contemplated that any number of second drain holes 120 with any spacing could be employed.

Figures 15, 16:
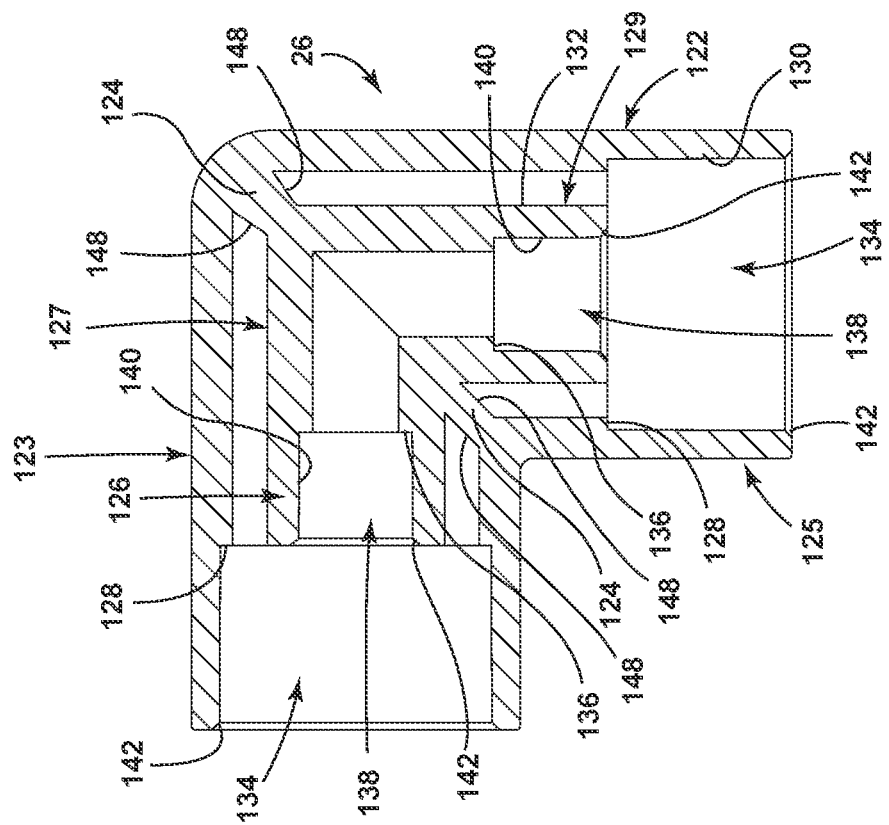
FIG. 15 is a bottom view of the 90° elbow double containment fitting according to an embodiment of the present invention.
FIG. 16 is a cross-sectional view of the 90° elbow double containment fitting according to an embodiment of the present invention taken along the line XVI-XVI of FIG. 15.

FIGS. 13-16 illustrate an embodiment of the 90° elbow double containment fitting 26 of the present invention. The 90° elbow double containment fitting 26 includes a bent outer cylinder 122 bent at a 90° angle forming a first outer cylinder portion 123 and a second outer cylinder portion 125. The 90° elbow double containment fitting 26 also includes a bent inner cylinder 126 bent at a 90° angle forming a first inner cylinder portion 127 within the first outer cylinder portion 123 and a second inner cylinder portion 129 within the second outer cylinder portion 125. As illustrated in FIG. 16, the first outer cylinder portion 123 and the second outer cylinder portion 125 meet at a 45° angle and the first inner cylinder portion 127 and the second inner cylinder portion 129 also meet at a 45° angle. A centrally located transverse partition 124 is located at the intersection of the first outer cylinder portion 123 and the second outer cylinder portion 125 and at the intersection of the first inner cylinder portion 127 and the second inner cylinder portion 129. The centrally located transverse partition 124 is formed integrally with the bent outer cylinder 122 and the bent inner cylinder 126 between an inner surface 130 of the bent outer cylinder 122 and an outer surface 132 of the bent inner cylinder 126.

As shown in FIGS. 13-16, each of the first outer cylinder portion 123 and the second outer cylinder portion 125 of the bent outer cylinder 122 of the 90° elbow double containment fitting 26 forms a pair of outer receiving openings 134 for receiving the outer tubes 18 the double containment pipes 12 positioned at a 90° angle. A circular outer ledge 128 is formed on the inner surface 130 of the bent outer cylinder 122 at each of the first outer cylinder portion 123 and the second outer cylinder portion 125, with the circular outer ledges 128 acting as an abutment for the outer tubes 18 of the double containment pipes 12 as the double containment pipes 12 are inserted into the 90° elbow double containment fitting 26. It is contemplated that the outer tubes 18 of the double containment pipes 12 can be held within the 90° elbow double containment fitting 26 via an interference fit and/or using an adhesive. It is further contemplated that the circular outer ledges 128 could form a closed circle or have one or more interruptions.

Likewise, each of the first inner cylinder portion 127 and the second inner cylinder portion 129 forms an inner receiving opening 138 for receiving the inner tubes 16 of the double containment pipes 12. A circular inner ledge 136 is formed on an inner surface 140 of the bent inner cylinder 126 at each of the first inner cylinder portion 127 and the second inner cylinder portion 129, with the circular inner ledges 136 acting as an abutment for the inner tubes 16 of the double containment pipes 12 as the double containment pipes 12 are inserted into the 90° elbow double containment fitting 26. It is contemplated that the inner tubes 16 of the double containment pipes 12 can be held within the 90° elbow double containment fitting 26 via an interference fit and/or using an adhesive. It is further contemplated that the circular inner ledges 136 could form a closed circle or have one or more interruptions. The outer receiving openings 134 and the inner receiving openings 138 can have beveled outer edges 142 for easy insertion of tubes therein.

Figure 14:
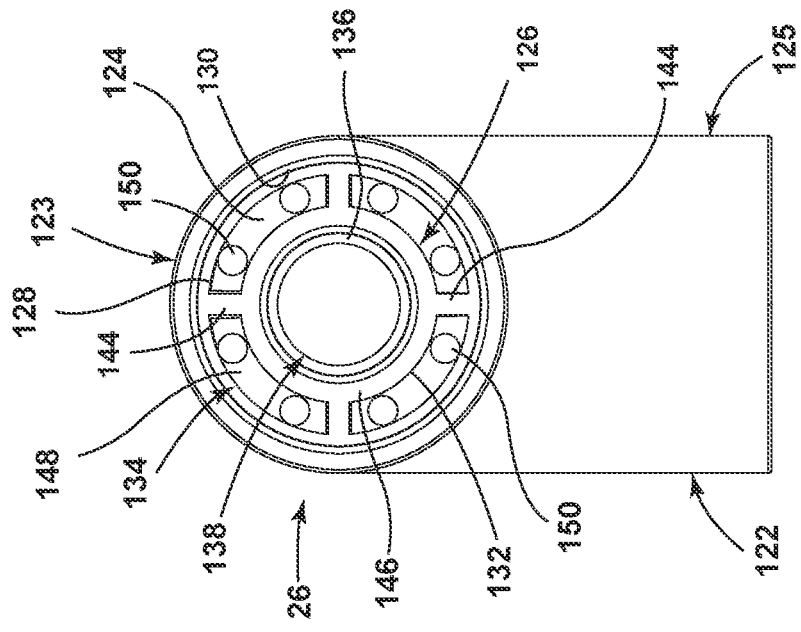
FIG. 14 is a side view of the 90° elbow double containment fitting according to an embodiment of the present invention.
Figure 13:
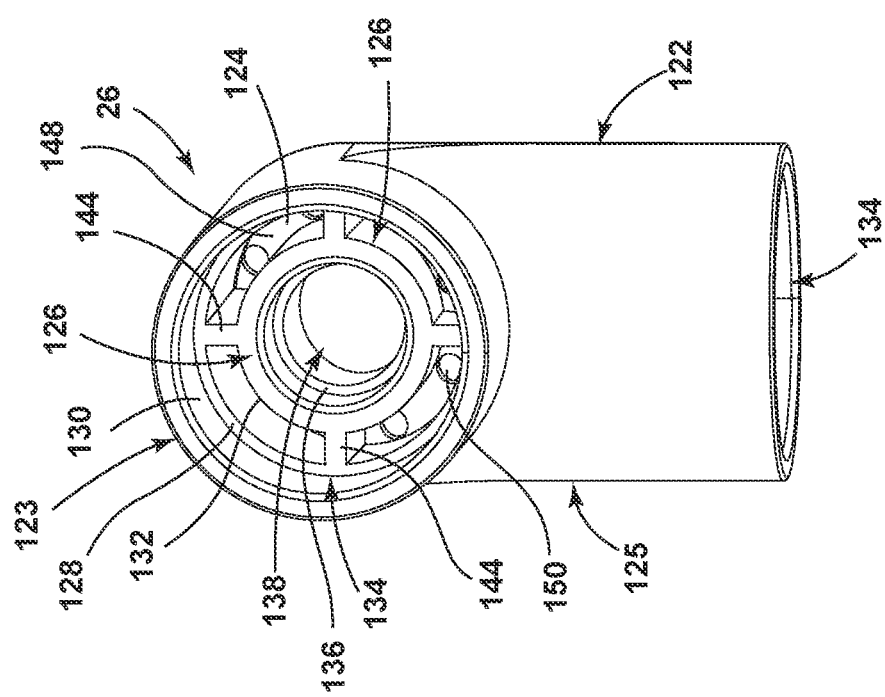
FIG. 13 is a perspective view of a 90° elbow double containment fitting according to an embodiment of the present invention.

In the illustrated example, the 90° elbow double containment fitting 26 includes features for stabilizing the structure and for allowing fluid to flow through the outer compartment between the bent inner cylinder 126 and the bent outer cylinder 122. As shown in FIGS. 13-15, a plurality of longitudinally extending ribs 144 extend from each opposite surface 148 of the centrally located transverse partition 124 between the inner surface 130 of the bent outer cylinder 122 and the outer surface 132 of the bent inner cylinder 126. In the illustrated example, the longitudinally extending ribs 144 terminate at the same level as the ends of the first inner cylinder portion 127 and the second inner cylinder portion 129 such that the ends of the ribs 144 and the first inner cylinder portion 127 and the second inner cylinder portion 129 form flat surfaces 146. However, it is contemplated that the longitudinally extending ribs 144 could end before the ends of the bent inner cylinder 126 or extend beyond the ends of the bent inner cylinder 126. While four equally spaced longitudinally extending ribs 144 are shown at each outer receiving opening 134, it is contemplated that any number of longitudinally extending ribs 144 with any spacing could be employed. Furthermore, to allow fluid to flow through the outer compartment between the bent inner cylinder 126 and the bent outer cylinder 122, the centrally located transverse partition 124 includes a plurality of drain holes 150. While eight equally spaced drain holes 150 are shown, it is contemplated that any number of drain holes 150 with any spacing could be employed.

FIGS. 17-21 illustrate an embodiment of a 45° elbow double containment fitting 200 of the present invention. The 45° elbow double containment fitting 200 is substantially identical to the 90° elbow double containment fitting 26, except that the 45° elbow double containment fitting 200 has less of a bend. The 45° elbow double containment fitting 200 includes an angled outer cylinder 202 angled at a 45° angle forming a first outer cylinder portion 203 and a second outer cylinder portion 205. The 45° elbow double containment fitting 200 also includes an angled inner cylinder 204 angled at a 45° angle forming a first inner cylinder portion 207 within the first outer cylinder portion 203 and a second inner cylinder portion 209 within the second outer cylinder portion 205. As illustrated in FIGS. 19-21, the first outer cylinder portion 203 and the second outer cylinder portion 205 meet at about a 45° angle and the first inner cylinder portion 207 and the second inner cylinder portion 209 also meet at a 45° angle. A centrally located transverse partition 206 is located at the intersection of the first outer cylinder portion 203 and the second outer cylinder portion 205 and at the intersection of the first inner cylinder portion 207 and the second inner cylinder portion 209. The centrally located transverse partition 206 is formed integrally with the angled outer cylinder 202 and the angled inner cylinder 204 between an inner surface 212 of the angled outer cylinder 202 and an outer surface 214 of the angled inner cylinder 204.

As shown in FIGS. 17-21, each of the first outer cylinder portion 203 and the second outer cylinder portion 205 of the angled outer cylinder 202 of the 45° elbow double containment fitting 200 forms a pair of outer receiving openings 210 for receiving the outer tubes 18 of the double containment pipes 12 positioned at a 45° angle. A circular outer ledge 208 is formed on the inner surface 212 of the angled outer cylinder 202 at each of the first outer cylinder portion 203 and the second outer cylinder portion 205, with the circular outer ledges 208 acting as an abutment for the outer tubes 18 of the double containment pipes 12 as the double containment pipes 12 are inserted into the 45° elbow double containment fitting 200. It is contemplated that the outer tubes 18 of the double containment pipes 12 can be held within the 45° elbow double containment fitting 200 via an interference fit and/or using an adhesive. It is further contemplated that the circular outer ledges 208 could form a closed circle or have one or more interruptions.

Likewise, each of the first inner cylinder portion 207 and the second inner cylinder portion 209 forms an inner receiving opening 218 for receiving the inner tubes 16 of the double containment pipes 12. A circular inner ledge 220 is formed on an inner surface 216 of the angled inner cylinder 204 at each of the first inner cylinder portion 207 and the second inner cylinder portion 209, with the circular inner ledges 220 acting as an abutment for the inner tubes 16 of the double containment pipes 12 as the double containment pipes 12 are inserted into the 45° elbow double containment fitting 200. It is contemplated that the inner tubes 16 of the double containment pipes 12 can be held within the 45° elbow double containment fitting 200 via an interference fit and/or using an adhesive. It is further contemplated that the circular inner ledges 220 could form a closed circle or have one or more interruptions. The outer receiving openings 210 and the inner receiving openings 218 can have beveled outer edges 228 for easy insertion of tubes therein.

Figures 17, 18:
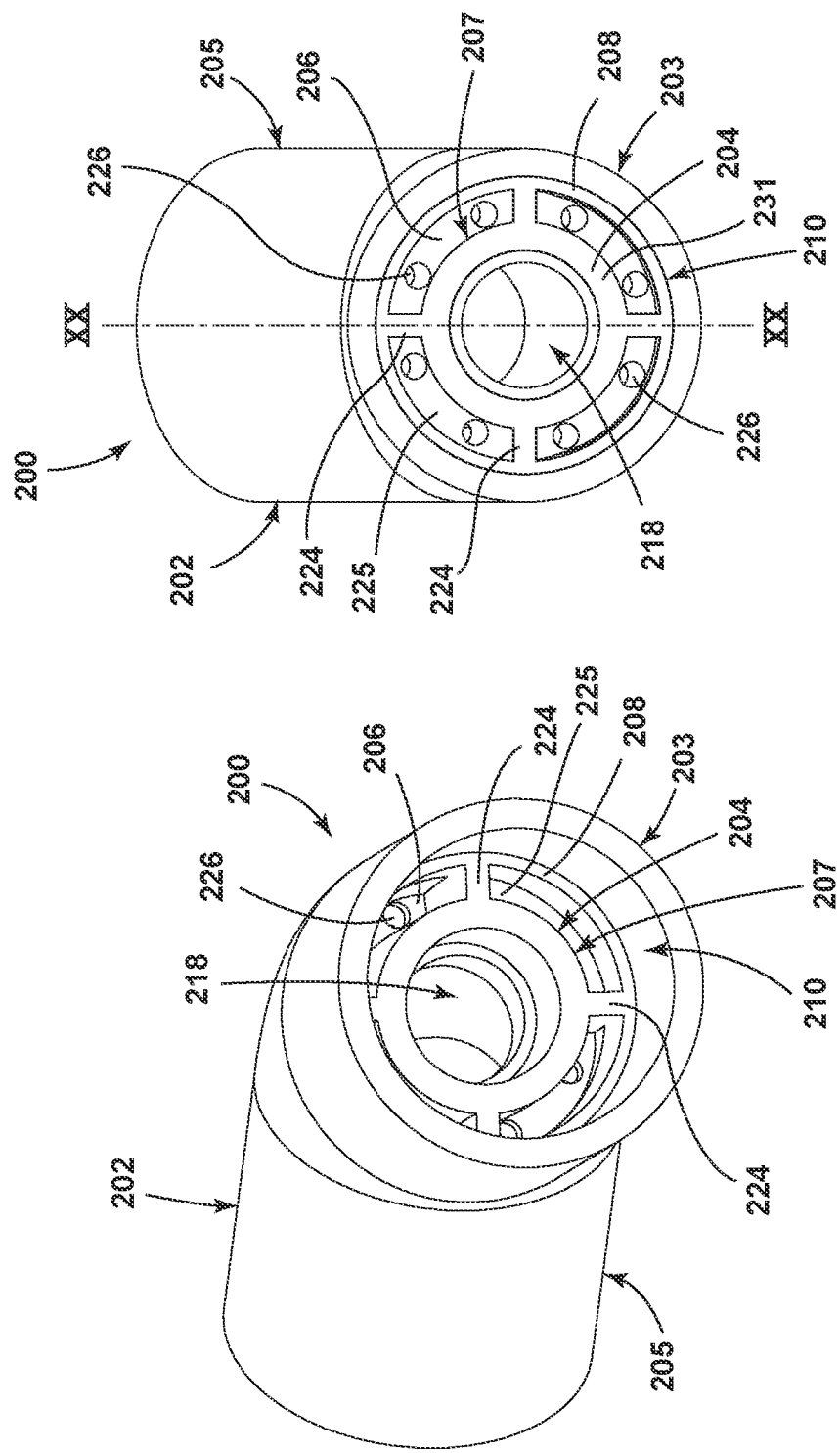
FIG. 17 is a perspective view of a 45° elbow double containment fitting according to an embodiment of the present invention.
FIG. 18 is an end view of the 45° elbow double containment fitting according to an embodiment of the present invention.

In the illustrated example, the 45° elbow double containment fitting 200 includes features for stabilizing the structure and for allowing fluid to flow through the outer compartment between the angled inner cylinder 204 and the angled outer cylinder 202. As shown in FIGS. 17, 18 and 20, a plurality of longitudinally extending ribs 224 extend from each opposite surface 225 of the centrally located transverse partition 206 between the inner surface 212 of the angled outer cylinder 202 and the outer surface 214 of the angled inner cylinder 204. In the illustrated example, the longitudinally extending ribs 224 terminate at the same level as the ends of the first inner cylinder portion 207 and the second inner cylinder portion 209 such that the ends of the ribs 224 and the first inner cylinder portion 207 and the second inner cylinder portion 209 form flat surfaces 231. However, it is contemplated that the longitudinally extending ribs 224 could end before the ends of the angled inner cylinder 204 or extend beyond the ends of the angled inner cylinder 204. While four equally spaced longitudinally extending ribs 224 are shown at each outer receiving opening 210, it is contemplated that any number of longitudinally extending ribs 224 with any spacing could be employed. Furthermore, to allow fluid to flow through the outer compartment between the angled inner cylinder 204 and the angled outer cylinder 202, the centrally located transverse partition 206 includes a plurality of drain holes 226. While eight equally spaced drain holes 226 are shown, it is contemplated that any number of drain holes 226 with any spacing could be employed.

Other double containment fittings 14 having these features include a double containment cross connector fitting (i.e., shaped like a plus ("+") sign), a double containment reducing or enlarging union socket fitting (wherein a first double containment pipe engaged with the double containment reducing or enlarging union socket has a larger diameter than a first double containment pipe engaged with the double containment reducing or enlarging union socket), and a double containment connector fitting. The double containment reducing or enlarging union socket fitting is substantially identical to the union socket double containment fitting 22, except the portions of the opposite sides of the centrally located transverse partition 30 have different diameters. The double containment connector fitting is a half of the union socket fitting with a connector (e.g., single tube with a threaded outer surface) on the other half of the union socket fitting.

In the embodiments of the fittings 14 as disclosed herein, each of the fittings 14 are integral single-piece structures formed in injection molding or casting processes. Specifically, the structure of the fittings 14 allow for the fittings 14 to be made by injection molding or casting processes in a form ready to use directly after molding or casting because of the special structure of the fittings 14, which does not have any areas that prevent the fittings from being made in injection molding or casting processes. The ribs and/or the transverse partitions hold the inner cylinders in place within the outer cylinders. It is noted that the fittings 14 could be formed without the transverse partitions, with the ribs holding the inner cylinders in position in place within the outer cylinders. When the transverse partitions are omitted, the spaces between the ribs are the drain holes for passage of fluid in the area between the outer cylinders and the inner cylinders.

Although particular preferred embodiments of the invention have been disclosed in detail for illustrative purposes, it will be recognized that variations or modifications of the disclosed apparatus, including the rearrangement of parts, lie within the scope of the present invention.

What is claimed is:

1. A double containment tubing assembly comprising:
a plurality of double containment pipes, each of the plurality of double containment pipes having an inner tube surrounded by an outer tube and a plurality of spacers spacing the inner tube from the outer tube, each of the plurality of double containment pipes having an inner flow path within the inner tube and an outer flow path located between the inner tube and the outer tube; and
a double containment fitting, the double containment fitting being connected to at least two of the plurality of double containment pipes;
the double containment fitting being formed as a one-piece integral structure and comprising:
at least one outer cylinder having at least two outer receiving openings;
at least one inner cylinder having at least two inner receiving openings; and
a plurality of ribs integral with and spacing the at least one outer cylinder from the at least one inner cylinder, thereby forming an inner fitting flow area within the inner cylinder and forming an outer fitting flow area between the at least one outer cylinder and the at least one inner cylinder and between adjacent ribs;
wherein each inner tube of the at least two of the plurality of double containment pipes connected to the double containment fitting being located within one of the inner receiving openings of the at least one inner cylinder of the double containment fitting;
wherein each outer tube of the at least two of the plurality of double containment pipes connected to the double containment fitting being located within one of the outer receiving openings;
wherein a first fluid flow path is located in the inner flow path and the inner fitting flow area of the double containment tubing assembly such that fluid is configured to flow through the first fluid flow path without leaking from the first fluid flow path;
wherein a second fluid flow path is located in the outer flow path and the outer fitting flow area of the double containment tubing assembly such that fluid is configured to flow through the second fluid flow path if a leakage occurs from the first fluid flow path; and
the double containment fitting includes a central partition located between each of the at least one outer cylinder and an associated one of the at least one inner cylinder within the associated one of the at least one outer cylinder; and
the plurality of ribs extend from opposite faces of the central partition.

2. The double containment tubing assembly of claim 1, wherein:
the double containment fitting is formed of transparent plastic.

3. The double containment tubing assembly of claim 1, wherein:
the at least one outer cylinder consists of a single outer cylinder; and
the at least one inner cylinder consists of a single inner cylinder.

4. The double containment tubing assembly of claim 3, wherein:
the single outer cylinder and the single inner cylinder each have a linear central axis.

5. The double containment tubing assembly of claim 3, wherein:
the single outer cylinder and the single inner cylinder each have an angled central axis.

6. The double containment tubing assembly of claim 5, wherein:
the angled central axis has a 90° angle.

7. The double containment tubing assembly of claim 5, wherein:
the angled central axis has a 45° angle.

8. The double containment tubing assembly of claim 1, wherein:
the at least one outer cylinder comprises a main outer cylinder and a lateral branch outer cylinder, the lateral branch outer cylinder being perpendicularly connected to a side surface of the main outer cylinder; and
the at least one inner cylinder comprises a main inner cylinder and a lateral branch inner cylinder, the lateral branch inner cylinder being perpendicularly connected to a side surface of the main inner cylinder;
the double containment fitting forms a T-shaped connection and the plurality of double containment pipes comprise three double containment pipes connected to the double containment fitting.

9. The double containment tubing assembly of claim 1, wherein:
the plurality of double containment pipes are straight.

10. A double containment fitting for engagement with a plurality of double containment pipes each having an inner tube surrounded by an outer tube and a plurality of spacers spacing the inner tube from the outer tube, the double containment fitting comprising:
a one-piece integral structure comprising:
at least one outer cylinder having at least two outer receiving openings;
at least one inner cylinder having at least two inner receiving openings; and
a plurality of ribs integral with and spacing the at least one outer cylinder from the at least one inner cylinder, thereby forming an inner fitting flow area within the inner cylinder and forming an outer fitting flow area between the at least one outer cylinder and the at least one inner cylinder and between adjacent ribs; and
a central partition located between each of the at least one outer cylinder and an associated one of the at least one inner cylinder within the associated one of the at least one outer cylinder, wherein the plurality of ribs extend from opposite faces of the central partition;
wherein each inner tube of the at least two of the plurality of double containment pipes being configured to be connected to the double containment fitting by being located within one of the inner receiving openings of the at least one inner cylinder of the double containment fitting;
wherein each outer tube of the at least two of the plurality of double containment pipes configured to be connected to the double containment fitting by being located within one of the outer receiving openings;
wherein the inner flow path is configured such that fluid is configured to flow through the inner flow path without leaking from the inner flow path; and
wherein the outer fluid flow path is configured such that fluid is configured to flow through the outer fluid flow path if a leakage occurs from the inner fluid flow path.

11. The double containment fitting of claim 10, wherein:
the double containment fitting is formed of transparent plastic.

12. The double containment fitting of claim 10, wherein:
the at least one outer cylinder consists of a single outer cylinder; and
the at least one inner cylinder consists of a single inner cylinder.

13. The double containment fitting of claim 12, wherein:
the single outer cylinder and the single inner cylinder each have a linear central axis.

14. The double containment fitting of claim 12, wherein:
the single outer cylinder and the single inner cylinder each have an angled central axis.

15. The double containment fitting of claim 14, wherein:
the angled central axis has a 90° angle.

16. The double containment fitting of claim 14, wherein:
the angled central axis has a 45° angle.

17. The double containment fitting of claim 10, wherein:
the at least one outer cylinder comprises a main outer cylinder and a lateral branch outer cylinder, the lateral branch outer cylinder being perpendicularly connected to a side surface of the main outer cylinder; and
the at least one inner cylinder comprises a main inner cylinder and a lateral branch inner cylinder, the lateral branch inner cylinder being perpendicularly connected to a side surface of the main inner cylinder;
the double containment fitting forms a T-shaped connection configured to be connected to three double containment pipes.

\* \* \* \* \*